US006451382B2

(12) United States Patent
Schutt et al.

(10) Patent No.: US 6,451,382 B2
(45) Date of Patent: Sep. 17, 2002

(54) METHOD FOR IMPROVING HEAT EFFICIENCY USING SILANE COATINGS AND COATED ARTICLES PRODUCED THEREBY

(76) Inventors: John B. Schutt, 2403 Peachstone Ct., Silver Spring, MD (US) 20905; Anthony A. Gedeon, 10 Carlos Ct., Palm Coast, FL (US) 32137; Jeffrey Stanich, 1274 Village Centre Dr., #4, Kenosha, WI (US) 53144

( * ) Notice: Subject to any disclaimer, the term of this patent is extended or adjusted under 35 U.S.C. 154(b) by 0 days.

(21) Appl. No.: 09/778,942

(22) Filed: Feb. 8, 2001

Related U.S. Application Data

(60) Provisional application No. 60/181,061, filed on Feb. 8, 2000, provisional application No. 60/185,354, filed on Feb. 28, 2000, provisional application No. 60/185,367, filed on Feb. 28, 2000, and provisional application No. 60/236,158, filed on Sep. 29, 2000.

(51) Int. Cl.⁷ ................................................ B05D 3/02
(52) U.S. Cl. ....................................................... 427/387
(58) Field of Search .......................................... 427/387

(56) References Cited

U.S. PATENT DOCUMENTS

| | | | |
|---|---|---|---|
| 3,576,028 A | * | 4/1971 | Fish |
| 4,338,375 A | | 7/1982 | Hashimoto et al. |
| 4,466,832 A | * | 8/1984 | Yoshimura et al. |
| 4,605,446 A | | 8/1986 | Isozaki |
| 4,871,788 A | | 10/1989 | Plueddemann |
| 5,584,921 A | | 12/1996 | Wagner et al. |
| 5,849,369 A | * | 12/1998 | Ogawa ........................ 427/387 |
| 5,882,543 A | * | 3/1999 | Peterson et al. |
| 6,000,339 A | | 12/1999 | Matsuzawa |
| 6,057,040 A | | 5/2000 | Hage |

FOREIGN PATENT DOCUMENTS

| | | | |
|---|---|---|---|
| JP | 01-223188 | * | 9/1989 |
| JP | 10-148488 | * | 6/1998 |
| JP | 2000-026759 | * | 1/2000 |

* cited by examiner

*Primary Examiner*—Erma Cameron
(74) *Attorney, Agent, or Firm*—Sherman & Shallway

(57) ABSTRACT

Oligomeric silane coating compositions containing, for example, methyltrimethoxysilane, are used to coat new or used heat exchange apparatus, such as HVAC systems, to greatly improve the heat transfer efficiency and prevent or inhibit corrosion. These oligomeric coating compositions are able to fill microvoids in the heat exchange surfaces, and penetrate into the microcavities at the interface of swaged or force fit surfaces, such as fins and tubes. The oligomeric silane coating compositions are highly active and will form bonds not only with the metal and metal oxides of the heat transfer surfaces, but will also displace gasses or liquids at the heat transfer contact surfaces and form chemical and/or hydrogen bonds with the oxides and chemical impurities. By so doing, a parallel heat transfer pathway is formed. The applied coatings may be as thin as only a few millionths of an inch and will fill microcavities to a depth of up to about 2000 nanometers. The coated heat transfer surfaces are non-adherent to deposition of soils and microorganisms and, therefore, are easier to maintain and are environmentally safe for use to heat/cool inhabited structures.

8 Claims, No Drawings

METHOD FOR IMPROVING HEAT EFFICIENCY USING SILANE COATINGS AND COATED ARTICLES PRODUCED THEREBY

CROSS-REFERENCE TO RELATED APPLICATIONS

This application claims priority from Provisional Applications Nos. 60/181,061, 60/185,354, 60/185,367, and 60/236,158, filed Feb. 8, 2000, Feb. 28, 2000, Feb. 28, 2000, and Sep. 29, 2000, respectively.

BACKGROUND OF THE INVENTION

1. Field of the Invention

This invention relates to use of silane based coating compositions for coating heat exchange systems, such as HVAC systems, whereby heating efficiencies and corrosion protection are both substantially improved. More particularly, the present invention is concerned with improving performance and useful lifetime of heat exchange systems wherein the heat exchange surfaces are coated with a very thin coating of glass-like silane based coating composition which penetrate into very small spaces at the interface between and in the heat exchange surfaces to provide a parallel path for heat transfer and prevent corrosion, thereby greatly improving short- and long-term efficiency.

2. Discussion of the Prior Art

Silane, silanol and siloxane compounds have been used for many years, as both solvent-based and aqueous-based, formulations, with or without modification with organic substituents, for such applications as coupling agents for glass or other inorganic substrates to organic compounds; non-permanent (limited life) water repellants for concrete and woven fabric materials; synthetic rubber like compounds for adhesives and sealers; adhesion modifiers for organic paints and inorganic coatings; and other property enhancing uses which take advantage of having the ability to form moderate to strong hydrogen bonds to organic and inorganic surfaces, more tenaciously than most classes of polymeric coatings.

U.S. Pat. Nos. 3,944,702, 3,976,497, 3,986,997 and 4,027,073 describe coating compositions which are acid dispersions of colloidal silica and hydroxylated silsequioxane in an alcohol-water medium.

U.S. Pat. No. 4,113,665 discloses chemically resistant ambient curable coatings based on a binder of which the major portion is prepared by reacting, in an acidic solution, trialkoxysilanes (e.g., methyltriethoxysilane) with aliphatic polyols, silicones or both. Barium fillers, such as barium metaborate, may be added to provide resistance to sulfur dioxide. Zinc oxide or metallic zinc may be included for further corrosion resistance. The compositions may be applied to, e.g., steel petroleum tanks, by spraying, concrete, vitreous surfaces.

U.S. Pat. No. 4,413,086 describes water reducible coating compositions containing organosilane-polyol which is a reaction product between certain hydrophilic organic polycarbinols and organosilicon material, e.g., organosilane, curing agent (e.g., aminoplast resin), organic solvent (optional), essentially unreacted polyol (optional), essentially unreacted hydrolyzed and condensed organosilane (optional), water (optional) and pigment (optional).

U.S. Pat. No. 4,648,904 describes an aqueous emulsion of (a) hydrolyzable silane, inclusive of methyltrimethoxysilane, (b) surfactant (e.g., Table I, col. 4) and (c) water. The coatings may be used for rendering masonry water repellant.

U.S. Pat. No. 5,275,645 is purported to provide an improvement to the acid-catalyzed organosilane coating compositions of the above-mentioned U.S. Pat. No. 4,113,665. According to this patent a protective coating is obtained at ambient temperature from a coating composition containing organosilanes having an Si—O bond, using an amine catalyst and an organometallic catalyst.

U.S. Pat. No. 5,879,437 describes a coating composition containing a tetraalkyl silicate or monomeric or oligomeric hydrolysis product thereof, present in a proportion of 40–90% by weight based on the non-volatile content of the composition and a hydrous oxide sol (Type A or Type B), in an amount such that the oxide constitutes 10–60% by weight of the non-volatiles. According to the patentees, this coating composition is suitable for the pretreatment of solid surfaces such as metals generally, including steel, titanium, copper, zinc and, particularly aluminum, to improve adhesion properties of the pretreated surface to subsequently applied coatings, such as paint, varnish, lacquer; or of adhesive, either in the presence or absence of a lubricant.

U.S. Pat. No. 5,882,543 describes methods and compositions for dehydrating, passivating and coating HVAC (heating, ventilating and air conditioning) systems. The compositions include an organometalloid and/or organometallic compound, which reacts with water in the system. The sealing function of these compositions is apparently obtained by introducing the composition to the fluid enclosure and upon exiting from an opening, the composition (i.e., organometallic) reacts with atmospheric moisture to seal the opening.

U.S. Pat. No. 5,954,869 discloses an antimicrobial coating from water-stabilized organosilanes obtained by mixing an organosilane having one or more hydrolyzable groups, with a polyol containing at least two hydroxyl groups. This patent includes a broad disclosure of potential applications and end uses, e.g., column 4, lines 35–53; columns 23–25.

U.S. Pat. No. 5,959,014 relates to organosilane coatings purported to have extended shelf life. Organosilane of formula $R_nSiX_{4-n}$ (n=0–3; R=non-hydrolyzable group; X=hydrolyzable group) is reacted with a polyol containing at least three hydroxyl groups, wherein at least any two of the at least three hydroxyl groups are separated by at least three intervening atoms.

U.S. Pat. No. 5,929,159, to J. Schutt and A. Gedeon, and commonly assigned with the present application, describes an oligomeric coating composition in the form of an aqueous composition comprising a dispersion of divalent metal cations (especially, Ca, Mn, Cu and Zn divalent ions) in lower aliphatic alcohol-water solution of the partial condensate of at least one silanol (at least about 70 wt.% of which was methyltrimethoxy silane), and acid, in amount to provide a pH in the range of from about 2.5 to about 6.2, the amount of the divalent metal cations being from about 1.2 to about 2.4 millimoles, per molar equivalent of the partial condensate, calculated as methyl silane sesquioxide. It is also described to provide a coating composition as a two part formulation, the first part being an acidic aqueous dispersion of divalent metal cation, having a pH of from about 2.2 to about 2.8; and the second part a non-aqueous composition comprising at least one trialkoxy silane; with at least one of the first and second parts comprising a volatile organic solvent. The corrosion resistant coatings may be provided as aqueous-alcoholic dispersions of the partial condensate of monomethyl silanol (obtained by hydrolysis of monomethyl alkoxysilane) alone or in admixture with minor amounts of other silanol, e.g., phenyltrimethoxysilanol, gamma-glycidyloxy silanol, and the like, wherein the reaction is catalyzed by divalent metal ions, e.g., $Ca^{+2}$, typically from alkaline earth metal oxides. When these coating are applied to, e.g., boat hulls, such as aluminum hulls, they are highly effective in preventing corrosion from salt water for extended periods.

Thus, this patent indicates that the patented coating compositions are suitable for application to various types of substrates, but especially, marine surfaces, such as aluminum boat hulls, to render the surface corrosion resistant in a salt water environment. Other representative potential applications and substrates for the patented silane based coating compositions mentioned in the Schutt and Gedeon patent include coatings for concrete/rock, wherein the coating can penetrate the porous materials, due to its low viscosity and active nature; metals/plastics, wherein the coating is preferably applied to very clean surfaces but will itself clean the pores in the metal or plastic and exhume the contamination which generally rises to the surface of the coating.

The compositions of the Schutt, et al patent are oligomeric coatings using a variety of siloxane bond forming monomers as described. Subsequent modifications of the compositions of the U.S. Pat. No. 5,929,159 patent have been developed by John Schutt and are described, for example, in copending provisional applications Ser. Nos. 60/185,367 and 60/185,354, both filed on Feb. 28, 2000, and Ser. No. 60/236,158, filed Sep. 25, 2000. Basically, these provisional applications disclose formulations for silane/siloxane/silanol oligomeric compositions, both solvent (non-aqueous) and water (aqueous) based, which effectively bond to many different metallic and non-metallic surfaces by means of siloxy (—Si—O—) bonds.

The compositions disclosed by the 5,929,159 patent and provisional applications can cure under ambient conditions and are catalyzed using, for example, acid, alkali, and metal alkoxide, catalysts. They may contain organic additives forming hydrogen bonds of greater energy than those formed with water. Protection of metallic surfaces occur because bonds of greater covalency are created which are more robust than dipole or dispersion forces.

SUMMARY OF THE INVENTION

It has now been discovered that the coating compositions of U.S. Pat. No. 5,929,159, and subsequently developed formulations, as described in the aforementioned three provisional applications, Ser. Nos. 60/185,354, 60/185,367, and 60/236,158, the entire disclosures of which are incorporated herein, in their entireties, by reference thereto, are very highly effective in providing strongly adherent, corrosion resistant coatings for heat exchange systems, including, especially, air conditioning units and other HVAC systems, and the individual components thereof. Although not wishing to be bound by any particular theory of operation, it is believed that the effectiveness of these siloxy bond forming coating compositions arises, at least in part, from the oligomeric nature of these compositions. The low molecular weight of the oligomeric components and the low viscosity of the composition, enables them to penetrate the defect surface structure found in all surfaces, with the option of creating dendritic-like networks over a surface. In particular, scanning electron microphotographs show that compositions as described herein penetrate defects having nanometer dimensions while forming films on the order of millionths of an inch in depth.

These compositions may be applied not only to coat new heat exchange systems and component parts thereof, e.g., coils, condensers and the like, but also may be applied in situ to existing heat exchange systems and component parts, even when the system or individual parts thereof are corroded.

Accordingly, the present invention provides a method for improving heat exchange (thermal) efficiency of heat transfer surfaces and corrosion protection for heat transfer surfaces and heat transfer systems and component parts thereof by coating the heat transfer surfaces alone or the entire heat transfer system or component parts thereof, with a low viscosity, penetrating, reactive, curable, film-forming, silane-based, coating composition and curing the composition to thereby form an at least substantially continuous glass-like coating on the coated surface, the coating extending into voids and defects which may be present in the surface, whereby a thermally conductive corrosion protective layer is provided on the heat transfer surface, and any other coated surfaces.

In one embodiment, the present invention provides a method for improving efficiency of heat transfer from a heat transfer medium flowing in heat transfer contact with a heat transfer surface of a thermally conductive component of a heat transfer system across the heat transfer surface.

In a particularly preferred embodiment of the invention, the coating composition is applied to at least the heat exchange surfaces of a fin and tube heat exchange system.

In the preferred embodiment of the invention, the coating composition is an aqueous or non-aqueous oligomeric silane coating composition formed by admixing (a) at least one silane of the formula (1)

$$R^1{}_n Si(OR^2)_{4-n} \qquad (1)$$

where $R^1$ represents a $C_1$–$C_6$ alkyl group, a $C_6$–$C_8$ aryl or a functional group including at least one of vinyl, acrylic, amino, mercapto, or vinyl chloride functional groups; $R^2$ represents a $C_1$–$C_6$ alkyl or acetyl group and n is a number of 1 to 2

(b) silane condensation catalyst, and (c) $C_2$–$C_4$ alkanol solvent, and optionally, one or more of (d) colloidal aluminum hydroxide;

(e) metal alcoholate of formula (2):

$$M(OR^3)_m \qquad (2)$$

where M is a metal of valence 2, 3 or 4, or mixture of two or more such metals;

$R^3$ represents a $C_1$–$C_6$ alkyl group; and, m represents a number or 2, 3 or 4;

(f) a silica component selected from the group consisting of alkali metal silicate, ethyl orthosilicate, ethyl polysilicate, and colloidal silica dispersed in lower alkanol;

(g) color forming silanol condensation catalyst;

(h) epoxysilane; and, (i) titanium dioxide ultraviolet light absorber.

The coating composition is applied to at least a portion of a heat transfer surface and the applied coating composition is allowed to cure to form a highly corrosion resistant and strongly adherent coating. This coating is effective to fill micropores and crevices in the heat transfer surface to effectively increase the area available for heat transfer.

Similarly, the present invention provides a method for increasing the contact area between first and second heat transfer surfaces in thermal contact with each other, thereby improving the heat transfer efficiency across the thermally contacting heat transfer surfaces. The method according to this embodiment comprises applying to the thermally contacting heat transfer surface of at least one of the first and second heat transfer surfaces, a low viscosity, penetrating, curable, reactive, film-forming, coating composition and curing the composition to thereby form an at least substantially continuous glass-like coating on the heat transfer surface, the coating extending into voids and defects which may be present in said heat transfer surface, whereby a thermally conductive corrosion protective layer is provided on the heat transfer surface.

Here again, the preferred coating composition is an aqueous or non-aqueous oligomeric silane coating composition formed by admixing (a) at least one silane of the formula (1)

$$R^1{}_n Si(OR^2)_{4-n} \qquad (1)$$

where $R^1$ represents a $C_1$–$C_6$ alkyl group, a $C_6$–$C_8$ aryl or a functional group including at least one of vinyl, acrylic, amino, mercapto, or vinyl chloride functional groups; $R^2$ represents a $C_1$–$C_6$ alkyl or acetyl group and n is a number of 1 or 2

(b) silane condensation catalyst, and (c) $C_2$–$C_4$ alkanol solvent, and optionally, one or more of (d) colloidal aluminum hydroxide;

(e) metal alcoholate of formula (2):

$$M(OR^3)_m \qquad (2)$$

where M is a metal of valence 2, 3 or 4, or mixture of two or more such metals;

$R^3$ represents a $C_1$–$C_6$ alkyl group; and, m represents a number or 2, 3 or 4;

(f) a silica component selected from the group consisting of alkali metal silicate, ethyl orthosilicate, ethyl polysilicate, and colloidal silica dispersed in lower alkanol;

(g) color forming silanol condensation catalyst;

(h) epoxysilane;

(i) titanium dioxide ultraviolet light absorber;

(j) water; and (k) co-solvent.

In a particularly preferred embodiment, the efficiency of heat exchange apparatus of the type wherein a metal-to-metal contact is present wherein a metal heat transfer surface is swaged or force fit to a metal heat transfer fluid conveyance is improved by applying to the metal to metal contact a low viscosity, penetrating, curable, reactive, film-forming, coating composition and curing the composition to thereby form an at least substantially continuous glass-like coating on said heat transfer surface, said coating extending into voids and defects which may be present in said heat transfer surface, whereby a thermally conductive corrosion protective layer is provided on said heat transfer surface. Preferably, the above described aqueous or non-aqueous oligomeric silane coating composition containing the silane of formula (1), silane condensation catalyst and solvent, and one or more optional ingredients, is applied to the interface of the metal-to-metal contact portions, whereby the oligomeric coating composition will displace gasses and liquids in the interface; and allowing the coating composition to cure to a film thickness of from about 5 to about 150 millionths of an inch, while also filling microvacancies in the metal surfaces at the metal-to-metal contact interface.

The present invention also provides the coated heat exchange surfaces and heat exchange systems and component parts, especially, fin and tube heat exchange systems.

DETAILED DESCRIPTION OF THE INVENTION AND PREFERRED EMBODIMENTS

The coating compositions used in the present invention may generally be characterized as low molecular weight oligomeric silane based coatings. As used in this context the term "silane" is intended to include not only silanes but also silanols and siloxanes and the low molecular weight partial condensation products thereof. The term "low molecular weight" is intended to refer to the general absence of large or bulky organic molecules or moieties as part of the silane components, namely, wherein the organic substituents are generally limited to lower alkyl groups, especially alkyl groups containing from 1 to 4 carbon atoms, especially, 1 to 3 carbon atoms, including, in particular, methyl, ethyl, n-propyl and iso-propyl groups, and aryl groups of no more than about 8 carbon atoms, especially, no more than about 6 carbon atoms, such as, for example, phenyl, benzyl, and phenethyl.

Still further, the coating compositions of this invention are characterized by low viscosity to facilitate the penetration into the microcrevices and microvoids present on the heat transfer surface. As used herein, "low viscosity" is taken to mean the ability to penetrate into micron and submicron size voids in metal surfaces. Typically, the coating compositions of the present invention are characterized by a coating viscosity, measured using a No. 2 (#2) Zahn Cup, of from about 4 to about 10 seconds, especially, from about 5 to about 8 seconds, measured at room temperature (approximately 18° C.).

The present invention also provides improved heat transfer systems coated with the subject silane based anticorrosion coating compositions as described herein. In particular, the invention coating compositions may be applied as protective coatings for new or refurbished heat transfer systems and components as well as applied in situ to used, corroded or rusted heat transfer systems and component parts thereof to significantly improve performance and increase the useful life of the treated systems and component parts.

The compositions according to this invention are able to readily penetrate into extremely small spaces and crevices, including down to nanometer inclusions in the indices of the metal substrates used to manufacture heat exchange systems and component parts. As compared to conventional organic coatings, including known silane based coating compositions, the compositions of the present invention are characterized by low cohesive forces and, as a result, tend to wick into such small micro-spaces due to their active chemical nature. Thus, for example, organic coatings, including acrylics, polyurethanes, epoxies and phenolics, will not naturally wick into the small (e.g., micro-voids) metal contact irregularities, even when applied by E-coating (electrocoating) techniques. While it has been suggested in the art to mix some silane/siloxane compounds with acrylics, acrylic urethanes, organic acids and epoxides, however, these known formulations are not able to take advantage of the small active molecules which characterize the present compositions, which are capable of wicking into extremely small voids in and between thermal contact surfaces.

The coating compositions used in the present invention are capable of filling small nanometer size voids under driving forces of capillary action and Helmoltz free energy, displacing gasses and/or reacting with water or other chemicals. The ability of the coating compositions of this invention to migrate and penetrate capillary structures releasing Helmoltz free energy allows them to displace molecules bonded by means of secondary and tertiary valence forces and provide protection by forming micron range thickness coatings, on the order of from about 5 to about 150 millionths of an inch. These driving forces even allow such penetration to occur under the high pressures, e.g., 2000 p.s.i., present in joints of such heat exchangers. Accordingly, the coating of the present invention are highly effective for increasing the efficiency of heat exchangers by providing parallel thermal paths between metal contact of, for example, heat dispersing fins and tubing or piping carrying fluids or gases for absorption or dispersion of heat.

The preferred low viscosity, penetrating, active coating compositions used in the present invention are silane based coating compositions, and may be may be aqueous or non-aqueous. Preferred coating compositions are formed by admixing (a) at least one silane of formula (1)

where $R^1$ represents a $C_1$–$C_6$ alkyl group, a $C_6$–$C_8$ aryl group or a functional group including at least one of vinyl, acrylic, amino, mercapto, or vinyl chloride functional groups; with (b) a silane condensation catalyst, which may be, for example, an acid, a base, or mixed acid-base and $R^2$ represents a $C_1$–$C_6$ alkyl or acetyl group and n is a number of 1 to 2. The silane(s) and catalyst are contacted in a low viscosity solvent, typically a lower alkanol solvent, such as ethanol, isopropanol, and the like. One or more additional reactive or functional ingredients may be included in the composition.

Representative examples of suitable oligomeric silane coating compositions useful in the present invention have been described in my above-identified patent and co-pending provisional applications and are described briefly below.

I. an aqueous coating composition comprising a dispersion of divalent metal cations in lower aliphatic alcohol-water solution of the partial condensate of at least one silanol of the formula $RSi(OH)_3$, wherein R is a radical selected from the group consisting of lower alkyl, or $C_6$–$C_8$ aryl or a functional group including at least one of vinyl, acrylic, amino, mercapto, or vinyl chloride functional groups (e.g., 3,3,3-trifluoropropyl, γ-glycidyloxypropyl, and γ-methacryloxypropyl), at least about 70 percent by weight of the silanol being $CH_3Si(OH)_3$, acid in amount to provide a pH in the range of from about 2.5 to about 6.2, said divalent metal cations being present in an amount of from about 1.2 millimoles to about 2.4 millimoles, per molar equivalent of the partial condensate, calculated as methyl silane sesquioxide;

II. an aqueous coating composition formed by admixing
(A) at least one silane of the formula (1)

wherein
$R^1$ is a $C_1$–$C_6$ alkyl or acetyl group, a $C_6$–$C_8$ aryl group or an N-(2-aminoethyl)-3-aminopropyl group, and
$R^2$ is a $C_1$–$C_6$ alkyl or acetyl group;

(B) an acid component selected from the group consisting of water-soluble organic acids, $H_3BO_3$ and $H_3PO_3$; and
(D) water;

III. a non-aqueous coating composition formed by admixing
(A) at least one silane of formula (1)

wherein $R^1$ represents $C_1$–$C_6$ alkyl, $C_6$–$C_8$ aryl, 3,3,3-trifluoropropyl, γ-glycidyloxypropyl, γ-(meth)acryloxypropyl, N-(2-aminoethyl)-3-aminopropyl, or aminopropyl group;
$R^2$ represents $C_1$–$C_6$ alky or acetyl group; and
n is an number of 1 to 2; and
(E) (i) vinyltriacetoxysilane, (ii) colloidal aluminum hydroxide; and/or (iii) at least one metal alcoholate of formula (2)

wherein M represents a metal or valence m,
$R^3$ represents $C_1$–$C_6$ alkyl group; and
m is a number of 2, 3 or 4;

IV. a non-aqueous coating composition formed by admixing
(A) at least one silane of formula (1)

wherein $R^1$ represents $C_1$–$C_6$ alkyl, $C_6$–$C_8$ aryl, 3,3,3-trifluoropropyl, γ-glycidyloxypropyl, γ-(meth)acryloxypropyl, N-(2-aminoethyl)-3-aminopropyl, or aminopropyl group;
$R^2$ represents $C_1$–$C_6$ alkyl or acetyl group; and
n is a number of 1 to 2;
(B) boric acid, optionally dissolved in lower alkanol;
(E) (i) vinyltriacetoxysilane; (ii) colloidal aluminum hydroxide; and/or (iii) at least one metal alcoholate of formula (2)

wherein M represents a metal of valence m,
$R^3$ represents $C_1$–$C_6$ alkyl group
m is an number of 2, 3 or 4; and,
(F) silica component selected from the group consisting of ethyl ortho-silicate, ethyl polysilicate and colloidal silica, dispersed in lower alkanol;

V. a non-aqueous coating composition formed by admixing
(A) at least one silane of formula (1)

wherein $R^1$ represents $C_1$–$C_6$ alkyl, $C_6$–$C_8$ aryl, 3,3,3-trifluoropropyl, γ-(meth)acryloxypropyl, N-(2-aminoethyl)-3-aminopropyl, or aminopropyl group;
$R^2$ represents $C_1$–$C_6$ alkyl or acetyl group; and
n is a number of 1 to 2;

(A') γ-glycidyloxypropyltrimethoxysilane;
(B) boric acid, optionally dissolved in lower alkanol;
(E) (i) vinyltriacetoxysilane, (ii) colloidal aluminum hydroxide; and/or (iii) at least one metal alcoholate of formula (2)

$$M(OR^3)_m \qquad (2)$$

wherein M represents a metal of valence m,
$R^3$ represents $C_1$–$C_6$ alkyl group
m is a number of 2, 3 or 4;

VI. an aqueous coating composition formed by admixing
(A) at least one silane of formula (1)

$$R^1{}_n Si(OR^2)_{4-n} \qquad (1)$$

wherein $R^1$ represents $C_1$–$C_6$ alkyl, $C_6$–$C_8$ aryl, or a functional group containing at least one of vinyl, acrylic, amino, mercapto, or vinyl chloride functional group; and
$R^2$ is a $C_1$–$C_6$ alkyl or acetyl group;
(B) acid component comprising a member selected from the group consisting of water-soluble organic acids, $H_3BO_3$ and $H_3PO_3$; and
(D) water;

VII. an aqueous coating composition formed by admixing
(A) at least one silane of formula (1)

$$R^1{}_n Si(OR^2)_{4-n} \qquad (1)$$

wherein $R^1$ represents $C_1$–$C_6$ alkyl, $C_6$–$C_8$ aryl, or a functional group containing at least one of vinyl, acrylic, amino, mercapto, or vinyl chloride functional group; and
$R^2$ is a $C_1$–$C_6$ alkyl group;
(C) alkali component; and
(D) water;

VIII. an aqueous coating composition formed by admixing
(A) at least one silane of the formula (1)

$$R^1 Si(OR^2)_3 \qquad (1)$$

wherein
$R^1$ represents $C_1$–$C_6$ alkyl group, $C_6$–$C_8$ aryl group or a bifunctional silane containing vinyl, acrylic, amino, or vinyl chloride functional group; and
$R^2$ is a $C_1$–$C_6$ alkyl or acetyl group;
(E) (ii) colloidal aluminum hydroxide, (iii) metal alcoholate of the formula (2)

$$M(OR^3)_m \qquad (2)$$

wherein
M is a metal of valence m,
$R^3$ is a $C_1$–$C_6$ alkyl group,
m is an integer of 3 or 4,
or (iii) mixture of (ii) and (iii); and
(D) water;

IX. an aqueous coating composition formed by admixing
(A) at least one silane of the formula (1)

$$R^1 Si(OR^2)_3 \qquad (1)$$

wherein
$R^1$ represents $C_1$–$C_6$ alkyl group, $C_6$–$C_8$ aryl group or a bifunctional silane containing vinyl, acrylic, amino, or vinyl chloride functional group; and
$R^2$ is a $C_1$–$C_6$ alkyl or acetyl group;
(D) water;
(G) chromium acetate hydroxide; and
(H) $C_2$–$C_4$ alkanol;

X. an aqueous coating composition formed by admixing
(A) at least one silane of the formula (1)

$$R^1 Si(OR^2)_3 \qquad (1)$$

wherein
$R^1$ represents $C_1$–$C_6$ alkyl group, $C_6$–$C_8$ aryl group or a functional group including at least one of vinyl, acrylic, amino, mercapto, or vinyl chloride functional group; and
$R^2$ is a $C_1$–$C_6$ alkyl or acetyl group;
(D) water;
(E) (ii) colloidal aluminum hydroxide, (iii) metal alcoholate of the formula (2)

$$M(OR^3)_m \qquad (2)$$

wherein
M is a metal of valence m,
$R^3$ is a $C_1$–$C_6$ alkyl group,
m is an integer of 3 or 4, or (iii) mixture of (ii) and (iii);
(F) alkali metal silicate, which may be hydrolyzed; and
(H) $C_2$–$C_4$ alkanol.

XI. a non-metallic aqueous coating composition formed by admixing
(A) at least one silane of the formula (1)

$$R^1 Si(OR^2)_3 \qquad (1)$$

wherein
$R^1$ represents $C_1$–$C_6$ alkyl group, $C_6$–$C_8$ aryl group or a functional group including at least one vinyl, acrylic, amino, mercapto, or vinyl chloride functional group; and
$R^2$ is a $C_1$–$C_6$ alkyl or acetyl group;
(A") 3-(2-aminoethylamino)propyltrimethoxysilane or 3-aminopropyltrimethoxysilane;
(D) water;
(H) $C_2$–$C_4$ alkanol; and
(I) epoxide silane;

XII. an aqueous coating composition formed by admixing
(A) at least one silane of the formula (1)

$$R^1 Si(OR^2)_3 \qquad (1)$$

wherein
$R^1$ represents $C_1$–$C_6$ alkyl group, $C_6$–$C_8$ aryl group or a functional group including at least one of vinyl, acrylic, amino, mercapto, or vinyl chloride functional group; and
$R^2$ is a $C_1$–$C_6$ alkyl or acetyl group;

(B) boric acid;

(C) at least one alkali component comprising an hydroxide or carbonate of divalent metal;

(D) water;

(H) $C_2$–$C_4$ alkanol, and (J) ethyl polysiloxane.

As examples of silanes of formula (1), wherein $R^1$ is an alkyl group or aryl group, mention may be made of, for example, methyltrimethoxysilane, ethyltrimethoxysilane, ethyltriethoxysilane, n-propyltrimethoxysilane, n-propyltriethoxysilane, isopropyltrimethoxy silane, n-butyltrimethoxy silane, isobutyltrimethoxy silane, phenyltrimethoxy silane, preferably methyltrimethoxy silane. In the case where $R^1$ is a functional group, mention may be made, for example, of N-(2-aminoethyl)-3-aminopropyltrimethoxy silane, 3-mercaptopropyltrimethoxy silane, 3-mercaptopropyltriethoxy silane, 3-aminopropyltriethoxy silane, 3-(meth)acryloxypropyl trimethoxy silane, 3-(meth)acryloxypropyltriethoxy silane, n-phenylaminopropyltrimethoxy silane, vinyltriethyoxy silane, vinyltrimethoxy silane, allyltrimethoxy silane, and any of the aminosilane catalysts, described herein below.

As used herein, the expression "functional group" is intended to include any group, other than hydroxyl, (including alkoxy, aryloxy, etc.), which is hydrolyzable to provide, in situ, a reactive group (e.g., reactive hydrogen) which will react, in other than a condensation reaction, with the substrate (e.g., metal), itself, or other reactive components in or from the coating composition.

The functional groups, in addition to the hydroxyl group (by hydrolysis of the $(OR^2)$ groups), tend to form three-dimensional or cross-linked structure, as well known in the art.

Moreover, in the various embodiments of the invention, it is often preferred to use mixtures of two or more silane compounds of formula (1). Mixtures of at least phenyltrimethoxysilane and methyltrimethoxysilane are often especially preferred.

Generally, total amounts of silane compounds of formula (1) will fall within the range of from about 40 to about 90 percent by weight, preferably from about 50 to about 85 percent by weight, based on the total weight of silanes, catalyst(s) and solvent(s).

In addition to silane compound(s) of formula (1), the composition may additionally include a bistrifunctional aminosilane, such as represented by the following formula (4):

$$X[R^1Si(OR^2)_3]_2 \qquad (4)$$

where $R^1$ and $R^2$ are as defined above, and X represents an amino group (—NH) or keto group

as a basic catalyst, not requiring acid stabilization. As a representative example of aminosilane or ketosilane catalyst according to formula (4), mention may be made of, for example, bis(trimethoxypropylsilane) amine, bis(trimethoxyethylsilane) amine, di(trimethoxybutylsilane) ketone, di(trimethoxypropylsilane) ketone, and the like. The silane compounds of formula (4) function as a less active basic catalyst, not requiring acidic passivation. Minor amounts, usually from about 1 to about 10 parts, preferably, from about 2 to about 8 parts, of compound of formula (4) per 100 parts of silane compound(s) of formula (1) provide satisfactory results.

The silane condensation catalyst (b) may be, for example, a base or alkali component. As examples, an inorganic base, such as, for example, calcium hydroxide, aluminum hydroxide or zinc hydroxide, or mixture thereof; or an organic base component, such as, for example, aminosilane, may be mentioned.

The amount of the base catalyst is generally, up to about 2%, such as, for example, from about 0.1 to 2.0%, by weight of the composition, especially, from about 0.2 to 1.6%.

The silane condensation catalyst (b) may also be, for example, an acid. As examples of the acid catalyst component (b), mention may be made of lower alkanoic acids, such as, for example, formic acid, acetic acid, propanoic acid, butyric acid, and inorganic acids, such as, for example, boric acid ($H_3BO_3$) or ortho-phosphorous acid ($H_3PO_3$), preferably acetic acid, boric acid or ortho-phosphorous acid, most preferably, for reasons of economy and safety, acetic acid. The acid may be added as free acid or as inorganic salt thereof, such as alkali metal (e.g., sodium), alkaline earth metal (e.g., calcium), or ammonium salt.

Generally, total amounts of the inorganic acid component will fall within the range of from about 0.3 to about 4 percent by weight, preferably from about 0.5 to about 3%, preferably, from about 0.5 to about 2.5 percent by weight, based on the total weight of silanes, acid component and water. For acetic acid, the preferred range is from about 0.1 to about 1.0 percent, preferably, from about 0.2 to about 0.7 percent, by weight, based on the total weight of the composition.

Of course, one or more other silanol condensation catalysts, as well known in the art, may be used in place of or in addition to the acid and/or base catalyst.

As examples of organic solvents (c), mention may be made of lower alkanol, e.g., $C_2$–$C_4$ alkanols, preferably isopropanol.

Generally, total amounts of organic solvent, such as, lower alkanol, will fall within a range of from 10 to about 50 percent by weight, preferably from 15 to about 40 percent by weight, based on the total weight of silane(s), acid component and/or base component and water. In some cases, however, substantially higher amounts may be convenient, especially where, for example, the coating compositions are applied, usually by spraying, to preexisting HVAC systems, such as, for example, evaporators, or other structures wherein ready access to component parts and/or to metal-metal heat transfer junctions, may be inhibited due to tight fits, etc.

Where it is deemed to be advantageous or necessary to provide especially dilute coating compositions, for example, amounts of alcohol solvent from about 40 to about 90% by weight, or more, especially, from about 50 or 60% by weight or higher, based on the total composition, it is often advantageous, to provide a portion of the solvent as a separate component to be added to the remainder of the composition after mixing of the silane(s) and silane condensation catalyst(s). In such case, the system may be provided as a two or three "pot" system, e.g., silane compound(s) in one pot, catalyst(s) in a second pot, a portion of alcohol solvent, e.g., isopropanol, with one or both of the first and second pots, and the remainder of the alcohol and/or water solvent in a third pot.

The coating compositions of this invention may be non-aqueous or aqueous. When water, as component (j), is present, the total amount of water will generally fall within the range of from about 10 to about 60 percent by weight, preferably from about 10 to about 45 percent by weight, based on the total weight of (a) silane(s), (b) catalyst component(s), (c) organic solvent, (j) water, (k) co-solvent.

Some or all of the water may be provided by the acid and/or base component, when the base or acid component is supplied as an aqueous solution, e.g., 5% aqueous solution of ortho-phosphorous acid or saturated aqueous solution of boric acid (about 6% by weight of $H_3BO_3$).

Since the presence of metallic and other impurities may have an adverse effect on the properties of the resulting coatings, preferably, water, when used, is distilled or deionized water.

According to a particularly preferred embodiment of the present invention, the coating compositions may include metal catalysts which additionally provide a tint or coloration to the resulting coating. Chromium acetate hydroxide is especially useful in this regard, serving as a basic catalyst which provides a bluish tint to the resulting coating. This feature may be especially useful, for example, in connection with providing corrosion resistant coatings to HVAC systems having large surface areas and/or difficultly accessible regions, where visibility of the applied coating can assure total coverage of the areas to be coated while avoiding wasting coating by excessive applications over already coated surfaces.

Other basic metal catalysts providing a colorant function include, for example, iron acetate, iron acetate hydroxide, chromium acetate, and the like. Other metal compounds such as compounds of antimony, lead, barium, etc., also form colored products, but tend to be more toxic and, therefore, less useful for general purposes.

The present coating composition may be formed by mixing the above-noted components and allowing them to react. A suitable reaction time is typically 4 to 12 hours, if no colloidal aluminum hydroxide and/or metal alcoholate is present. Shorter reaction times may be obtained in the presence of colloidal aluminum hydroxide and/or metal alcoholate.

For ease of handling, the coating composition may be provided as a two or three container system, e.g., the silane component and any silicate component, if present, being provided in a first container and all other components being provided in a second or second and third container. Water, when included in the composition, may be provided separately from the other components. The contents of the two or three (or more) containers may be mixed shortly prior to use and allowed to react for an appropriate reaction time, as noted above.

While general and preferred ranges of amount for the film-forming, catalytic and solvent components have been described above, it will be recognized by those skilled in the art, that these amounts may be increased or decreased as necessity demands and that the optimum amounts for any particular end use application may be determined by the desired performance and HVAC system to be coated, including type of system and location. In this regard, for example, when the amount of catalyst is reduced, the time to achieve freedom from tack will increase. Similarly, when the amount of the catalyst(s) is (are) increased, this may lead to increased rates of cracking, loss of adhesion and performance loss of the resulting coating.

The compositions of this embodiment may further include one or more additional additives for functional and/or esthetics effects, such as, for example, (d) colloidal aluminum hydroxide, (e) metal alcoholate, (f) silica and/or silicates, (g) color forming silanol condensation catalyst, (h) epoxide silane, (i) ultraviolet absorber, (j) water, (k) co-solvent, and the like.

The above-noted optional ingredients may be used singly or in any combination in the coating composition of this invention.

As examples of silicate component (f), mention may be made of ethyl or methyl orthosilicate or ethyl polysilicate. These silicates may be hydrolyzed, for example, from about 28% to about 52% silica. Especially preferred in this regard is tetraethylsilicate (TEOS) (often referred to simply as ethyl silicate) which has been subjected to controlled hydrolysis, providing a mixture of TEOS and, from about 20% to about 60% polydiethoxysilane oligomers. For example, a 50% hydrolysis product may be referred to herein as "polydiethoxysilane (50%)."

Generally, total amounts of silicate component, when used, will fall within the range of from 0 to about 45 percent by weight, preferably from 0 to about 25 percent by weight, based on the total weight of silanes, acid component and water.

As example of (k) co-solvent, mention may be made, for example, of mono-lower alkyl ether of alkylene (e.g., ethylene) glycol, such as, mono-$C_1$–$C_6$-alkyl ethers of ethylene glycol, for example, monomethyl ether, monoethyl ether, monopropyl ether, monobutylether, monopentylether or monohexylether, preferably monoethyl ether of ethylene glycol. Other known and conventional co-solvents may also be used, for example, acetone, ketones (e.g., methylethylketone, ethers (e.g., ethylether), esters (e.g., ethyl acetate), and the like. The co-solvents should also have low viscosity, e.g., lower than that of water, preferably, less than about 8 centipoise.

Generally, total amounts of the mono-lower alkyl ether of ethylene glycol or other co-solvent, when used, will fall within the range of from 0 to about 15 percent by weight, preferably from 0 to about 6 percent by weight, based on the total weight of silanes, acid component and water. However, in the event that one of the low viscosity solvents, e.g., methylethylketone, is used as the main solvent, the same amounts as discussed above for the preferred alcohol solvents, may be used.

As an example of (i) ultra-violet light absorber, mention may be made of titanium dioxide in finely powdered form, e.g., having an average particle diameter of about 20 nm. Other inorganic or organic ultra-violet light absorbers may be utilized in so far as they do not interfere with the objects of this invention.

Generally, total amounts of the ultra-violet light absorber, when used, will fall within the range of from 0 to about 10 percent by weight, preferably from 0 to about 5 percent by weight, based on the total weight of silanes, acid component and water.

Metal catalysts, such as, for example (d) colloidal aluminum hydroxide, and/or (e) metal alcoholates, such as those represented by the following formula (2):

$$M(OR^3)_m \qquad (2)$$

where M is a metal of valence m (namely, from Groups IIIA, IVA, IIB or IVB of the periodic table of the elements), e.g., boron, titanium, aluminum, indium, yttrium, cerium, lanthanum, silicon, tin, hafnium, etc. and $R^3$ is a lower alkyl group, e.g., $C_1$–$C_6$ straight or branched chain alkyl group, preferably $C_2$–$C_4$ alkyl group, most preferably, isopropyl, isobutyl or n-butyl; and m is an integer of 3 or 4, may also be used. Boron, aluminum and titanium are especially preferred as metal M because the alkoxides of these metals are more readily commercially available, and tend to be non-toxic).

As specific examples of the metal alcoholates of formula (2), mention may be made of titanium alcoholates of $C_2$–$C_4$ alkanols, e.g., titanium tetraisopropoxide and titanium tetrabutoxide.

In addition, double metal alcoholates of, for example, AlTi, AlZr, AlY, MgAl, MgTi, MgZr, etc., may also be used.

The presence of the trivalent and tetravalent metal ions are especially useful for coating compositions applied to steel since they tend to form insoluble (water and alkali) iron silicates, whereas the products of divalent metals, tend to be soluble.

Generally, total amounts of the colloidal aluminum hydroxide and/or metal alcoholate, when used, will fall within the range of from 0 to about 2.5 percent by weight, preferably from 0 to about 1 percent by weight, based on the total weight of (a) silane(s), (b) acid and/or base component (s) and solvent(s).

Within the above general proportions, and based on the weight of the entire composition, the amount (parts by weight) of the individual classes of ingredients, will usually fall within the following ranges: silane component (a) from about 15 to about 25 parts, preferably, as a mixture of from about 15 to about 20 parts of methyltrimethoxysilane and from about 1 to about 5 parts of phenyltrimethoxysilane; base component condensation catalyst (b), when present, from about 0.1 to 3 parts, preferably from about 0.2 to 2.5 parts; acid component condensation catalyst (b), when present, from about 0.2 to about 0.8 part; solvent, e.g., isopropyl alcohol, to provide the appropriate viscosity, generally, from about 5 to about 60 parts, preferably, from about 10 to about 40 parts; water (j), when present, from about 2.5 parts by weight to about 40 parts; silicate component (f), when used, from 0 to about 15 parts by weight; mono-lower alkyl ether of ethylene glycol and/or other co-solvent (k), when used, from 0 to about 3 parts; ultraviolet light absorber (i), when used, from 0 to about 2 parts by weight; colloidal aluminum hydroxide and/or the metal alcoholate, when used, from 0 to about 0.5 part by weight.

Furthermore, the above general and preferred amounts of the respective ingredients apply equally to the various embodiments I–XII, of the coating compositions, as identified above.

Moreover, on some occasions it has been observed that the activity of the coating compositions is so high that when applied too thickly, a random distribution of lumps, presumably due to gelling, may form. Such lumps, if present, can serve as corrosion initiation centers. Accordingly, one skilled in the art will recognize that the coating compositions according to this invention should preferably be applied in the minimum amount necessary to substantially completely coat the surface to be protected. Coating thicknesses of less than 1 mil, preferably, less than about 0.5 mil, are usually satisfactory.

Heat exchange devices often use a swaged metal to metal joint from fin to tube/pipe, made by hydraulically or physically expanding the tube/pipe to force intimate metal to metal contact for heat transfer from fin to joint. However, whether or not exacerbated by imperfections in the expansion techniques/equipment, or/and as a result of corrosion, the presence of micro-voids are inherent in such metal to metal contact. In accordance with the present invention, these micro-voids are filled by the new chemically active coating compositions described herein, thereby providing more efficient parallel heat paths as well as corrosion protection, not heretofore possible. Accordingly, the efficiencies of both new and used heat exchange apparatus is significantly increased while extending the useful service life of the apparatus. However, it is noted that the relative increases in efficiency are substantially higher for older and corroded systems, often on the order of 20% to 60% or even 80% or more improvements in efficiencies and reduction in operating costs, as compared to more modest, but substantial improvements, on the order of from about 1 to 4%, or higher, for new (e.g., OEM) HVAC systems and/or components. At the same time, however, by applying the coatings of the present invention to new or old HVAC systems and/or component parts, long term reductions in maintenance requirements and associated costs are achievable.

Organic coatings, such as epoxies, have a thermal conductivity generally about one hundredth the thermal conductivity of a metal-to-metal contact surface. Even with metal or other conductive fillers, which tend to have a short life from corrosion from molecular level water permeation, organic coatings are two orders of magnitude less conductive than metal-to-metal contact. Silicone or glass-like coatings formed according to the present invention, on the other hand, are generally less than 5 to 10 times less conductive than the metal-to-metal contact. However, the significant and unique ability of these coatings to penetrate metal-to-metal nano-voids created by the irregular microsurface profile of metals allows the coatings to fill a significant amount of void space in such metal-to-metal joint (e.g., fin-tube/pipe) and, while providing less conductivity, and offers a significant, parallel path for thermal conductivity.

Therefore, even for a corroded metal-to-metal thermal joint, e.g., a fin and tube structure, a significant improvement in thermal transfer efficiency will be achieved.

Often, electrolytes will react with metals or crystallize with such a thermal joint and create salts, other crystalline corrosion structures, or corrosion by-products that expand as they are formed with pressures as high as 2000 pounds per square inch. This causes the amount of contact in a metal to metal heat transfer joint, as described herein, to have less contact then when manufactured, or in some cases, virtually no direct contact due to air or corrosion by-products remaining between metal surfaces.

This problem is substantially completely avoided by the present invention since the subject coating compositions, in addition to displacing gasses, form bonds to the corrosion products, including chemical bonds to oxides, medium to strong hydrogen bonds to electrolytes, thereby dissolving the corrosion products, and/or encapsulating/filling and providing parallel thermal path(s) around the corrosion products. As a result, heat exchangers otherwise operating at low efficiencies due to corrosion, joint expansion and the like, will undergo a significant and substantial improvement in thermal conductivity as a result of the coating treatment according to this invention.

Again, while not wishing to be bound by any theory of operation, it is believed that the effectiveness of the instant classes of silane/siloxane coating compositions arises from the ability of such coatings to form dendritic interfacial linkages that effect their performance in thin layers, normally about 5 to about 150 millionths of an inch. Therefore, notwithstanding low thermal conductivities of the silane coatings, per se, due to the extremely thin nature of the deposited coatings, only an insignificant and negligible thermal loss occurs, in contrast to the thermal transfer gains by the parallel path for heat exchange.

Moreover, for new/original manufactured and/or refurbished exchangers, a 10 to 40% increase in surface conducting area is achieved by application of the present coatings (with thermal conductivities 5 to 10 times less than metal-to-metal contact) in a metal-to-metal joint. This will, therefore, produce an overall cooling/power reduction efficiency increase of usually from about 1 to about 10%.

The overall corrosion protection provided according to this invention, either within the metal-to-metal joint, which is effectively filled and rendered unavailable for penetration of electrolytes or other corrosive gases or chemicals; or on other heat transfer surfaces in contact with air, water, or conductive structure or media/chemical or conveyance (e.g., tube, pipe, conductive metal sink, etc.) for fluid or gases passed through the exchanger; are all protected with a double corrosion protection not offered by normal organic coatings. The instant coating compositions are effective, for example, in eliminating "white rusting" problems resulting from growth of zinc oxide on brass or other zinc-containing metals or alloys. In the present invention, the zinc and zinc oxide will be effectively brought into the polymeric matrix coating to not only eliminate further growth of the zinc oxide but enhancing the strengthening of the coating.

Coatings formed using the subject oligomeric silane based coating compositions, applied to metal surfaces and wiped off until only the areas of bonding remains, 5 to 20 millionths of an inch, form coated metal surfaces able to pass 700 to 1000 hours in as ASTM B-117 salt spray test. If the coating is allowed to grow the dendritic glass structures to about 150 millionths of an inch the combination of the bond and grasslike coating growth enables the coated metal surface to pass 4000 to 6000 hours in the same ASTM test.

Thus, a double protection is afforded the heat exchangers treated in accordance with the present invention.

The present invention may be applied to any type of heat exchange system and the component parts thereof. For example, mention may be made of evaporator and condensing coils in HVAC systems, radiators for dispelling or absorbing heat, exchangers with dissimilar or similar metals, refrigeration exchangers, and the like. A particularly preferred type of heat exchange system is the fin and tube type. Heat exchangers coated according to the present invention will maintain high efficiencies, equivalent or superior to new, uncoated exchangers, due to exclusion of electrolytes that would normally form corrosion products in metal contact areas, thereby retarding corrosion due to the dual surface chemical bond and coating structure formed on surfaces and in small inclusions in joints, not accessible with previously known coating materials.

The anticorrosion silane-based oligomeric coating compositions of this invention may be applied to confer protection on all heat transfer surfaces that come into contact with air, water, or conductive structure or media/chemicals, including, conveyances (e.g., tubes, pipes, conductive metal sinks, etc.) for liquid or gasses passing through the exchanger. For example, the present invention may be applied to coat new or used heat exchangers and all other components of air-conditioners and chillers, and other refrigeration devices, including cabinets, components, compressors, tubing, piping, grills, fans, motors, external electrical conduits, coated and uncoated wiring, switch boxes, and the associated nuts, bolts, and other connectors.

The coating compositions of this invention may be applied to new or used/corroded heat exchangers, made of similar or dissimilar metals, wherein heat transfer fluids or gasses flow in tubing, piping, or other forms of heat conveyance, which are swaged or expanded (e.g., force fit metal joints) to metal to metal contact with other heat exchanger surfaces, and cooled by, for example, air, water, conductive metal heat sink, etc., to increase efficiency of heat transfer of the heat exchanger by improving the metal to metal joint transfer by increasing the contact area between the similar or dissimilar metals. As a result of the improved efficiency, energy costs for running the coated units, e.g., air-conditioning condenser; condenser/chiller; will be substantially lowered.

The coated substrates of the HVAC systems and/or component parts, whether new or used/corroded, by virtue of the chemical bonding and silica or siloxane bonding, with the additional dendritic linkages, producing a glass-like structural formation over the chemical bond area, reduces the available chemical activity on the coated surfaces/interfaces of the metal or metal to metal, to thereby provide a "double" protection. This protection is provided on all heat transfer surfaces in contact with air, water, or conductive structure or media/chemicals; as well as on the conveyances (tubes, pipes, conductive metal sinks, etc.) for fluid or gases which pass through the exchanger.

In this regard, by filling the microvoids and macrovoids within the metal to metal joints, the metal becomes unavailable for penetration of electrolytes or corrosive gases or chemicals.

In addition, in view of the hydrophobic nature of the applied coatings, the coated surfaces will stay cleaner for longer periods of time, thereby affording significant and substantial savings in maintenance costs.

Moreover, in accordance with a particular feature of the present invention, even when corrosion protection is not of paramount importance, the coated HVAC systems and component parts according to the present invention are characterized by being non-adherent to various types of soiling agents and to microbial growths. Accordingly, the coated articles of the present invention have the additional advantage of requiring less frequent maintenance (e.g., cleaning) and, since they do not promote growth of microorganisms, e.g., fungi, mold spores, yeast, bacteria, and the like, are advantageous for use in protecting HVAC systems used to heat/cool occupied structures, e.g., offices, factories, and the like. That is, since growth of microorganisms is inhibited, when the HVAC systems and component parts thereof, e.g., evaporators, flow ducts, and the like, are treated in accordance with the present invention, subsequent introduction of microorganisms into the structures which are heated/cooled by the coated systems is greatly inhibited or prevented.

The invention will now be illustrated by the following non-limiting examples. It is understood that these examples are given by way of illustration only and without intent to limit the invention thereto.

REFERENTIAL EXAMPLE 1A

Calcium hydroxide (1 millimole) is added to 20 part water containing 0.3 grams glacial acetic acid. The initial pH is about 4.2. The acetic acid catalyst and the calcium hydroxide should react to form calcium acetate. In a separate container 20 parts of methyltrimethoxysilane is mixed with 20 parts isopropyl alcohol. While the silane-alcohol mixture is being stirred, the aqueous solution is slowly added. The composition is allowed to react for about 3 hours. The resulting mixture (oligomeric coating composition) has a viscosity of about 8 seconds, using a #2 Zahn cup, and is ready for application. The solids level of the composition is about 16%, based on sesquioxide content.

REFERENTIAL EXAMPLE 1B

The procedure of Referential Example 1A is repeated except that the 20 parts of methyltrimethoxysilane is added to 40 parts of isopropyl alcohol.

REFERENTIAL EXAMPLE 2

The procedure of Referential Example 1 is repeated, except that the amount of calcium hydroxide is changed from 1 millimole to 0.7 millimole.

REFERENTIAL EXAMPLE 3

The procedure of Referential Example 1 is repeated, except that the amount of calcium hydroxide is changed from 1 millimole to about 2.4 millimoles.

REFERENTIAL EXAMPLE 4

The procedure of Referential Example 1 is repeated, except that in place of calcium hydroxide, an equivalent amount of calcium oxide is used.

REFERENTIAL EXAMPLE 5

The procedure of Referential Example 1 is repeated, except that in place of calcium hydroxide, an equivalent amount of magnesium hydroxide is used.

REFERENTIAL EXAMPLE 6

The procedure of Referential Example 1 is repeated, except that in place of calcium hydroxide, an equivalent amount of zinc oxide is used.

REFERENTIAL EXAMPLE 7

The procedure of Referential Example 1 is repeated, except that in place of calcium hydroxide, a mixture of calcium hydroxide and zinc oxide is used.

REFERENTIAL EXAMPLE 8

The procedure of Referential Example 1 is repeated, except that, 0.4 parts 20 nanometer $TiO_2$, and 0.15 parts of hydroxybenzoylphenone, are added to the coating composition.

REFERENTIAL EXAMPLE 9

The procedure of Referential Example 1 is repeated, except that instead of using 20 parts of methyltrimethoxysilane and 20 parts isopropyl alcohol, a mixture of 18 parts methyltrimethoxysilane, 2.5 parts γ-glycidyloxypropylsilane and 1.9 parts phenyltrimethoxysilane and 20 parts isopropyl alcohol is used.

REFERENTIAL EXAMPLE 10

In a first container containing 20 parts isopropyl alcohol, methyltrimethoxysilane, phenyltrimethoxysilane and propyltrimethoxysilane are mixed in amounts of 15 parts, 1 part and 5 parts, respectively. In a second container, aminoethylaminopropyltrimethoxysilane {N-(2-aminoethyl)-3-aminopropyltrimethoxysilane}, water, acetic acid, and titanium dioxide (average particle size, 22nm), are mixed in amounts of 0.2 part, 13 parts, 0.4 part and 0.2 part, respectively. After combining the contents of the two containers, the resulting mixture is allowed at least four hours to homogenize. Faster homogenization will be achieved by using a mechanical shaker or stirrer.

REFERENTIAL EXAMPLE 11

In a first container containing 10 parts isopropyl alcohol, phenyltrimethoxysilane, methyltrimethoxysilane and tetrabutoxytitanate are mixed in amounts of 5 parts, 15 parts and 0.3, 0.4, 0.5 or 0.6 part, respectively. In a second container, isopropyl alcohol and an aqueous 3% boric acid solution are mixed in amounts of 13 parts and 13 parts, respectively. After combining the contents of the two containers, the resulting mixture is ready for application after about three hours.

REFERENTIAL EXAMPLE 12

10 parts of a 3% boric acid solution are placed in a first container. 20 parts of methyltrimethoxysilane, 10 parts of isopropyl alcohol and 0.5 part of tetrabutoxy titanate are mixed in a second container. The contents of the two containers are mixed together and allowed to react to form a coating composition.

REFERENTIAL EXAMPLE 13

20 parts of methyltrimethoxysilane, 10 parts of isopropyl alcohol and 0.2 parts of magnesium ethoxide are mixed until the solution becomes homogeneous. To this solution a base catalyst (a saturated solution of a mixture of calcium hydroxide, calcium carbonate and magnesium carbonate, diluted with 2 parts water), is added. The resulting formulation is allowed to react for about 1 hour.

REFERENTIAL EXAMPLE 14

After thoroughly mixing 20 parts methyltrimethoxysilane with 10 parts isopropyl alcohol, 0.2 parts of aminoethylaminopropyltrimethoxysilane is added to the resulting silane-alcohol mixture, and again thoroughly mixed. Then 6 parts of water is added to the resulting mixture and, after standing for 90 minutes, the composition is ready for use.

REFERENTIAL EXAMPLE 15

20 parts of methyltrimethoxysilane and 20 parts isopropyl alcohol are mixed and the resulting mixture is combined with 0.25 parts of aluminum isopropoxide under stirring until the aluminum isopropoxide is partially dissolved. To this mixture 6 parts water is added. After stirring for about one hour, the mixture is ready to be applied.

REFERENTIAL EXAMPLE 16

This example shows the use of a double metal alkoxide catalyst for the silane coating composition. A uniform solution, obtained by mixing 15 parts methyltrimethoxysilane, 5 parts phenyltrimethoxysilane, 20 parts isopropyl alcohol, and 2 parts polydiethoxysiloxane (~50% solids) is catalyzed with 6 parts of an alcoholic (isopropyl alcohol) solution of a double alkoxide of aluminum and titanium. The resulting mixture is allowed to react for about 4 hours using six parts water.

REFERENTIAL EXAMPLE 17

To a mixture formed by combining 20 parts methyltrimethoxysilane, 20 parts isopropyl alcohol, and 2 parts polydiethoxysiloxane (~52% solids), there is added a catalyst containing 0.6 parts boron ethoxide and 0.2 parts aluminum isopropoxide. After the solids are dissolved, water (6 parts) is added to complete the catalysis. The resulting mixture is allowed to stand (react) for about 1 hour.

REFERENTIAL EXAMPLE 18

20 parts methyltrimethoxysilane, and 20 parts isopropyl alcohol, are mixed with 0.2 parts of aminoethylaminopropyltrimethoxysilane (as hydrolysis catalyst). After thoroughly mixing with 6 parts water, the mixture is allowed to react (hydrolyze) for 45 minutes. Then, the mixture is combined with 0.3 parts phenyltrimethoxysilane predispersed in 10 parts isopropyl alcohol. After about 1 hour, the composition is ready to be applied.

REFERENTIAL EXAMPLE 19

Twenty (20) parts methyltrimethoxysilane, 5 parts phenyltrimethoxysilane and 20 parts isopropyl alcohol are combined and thoroughly mixed. To this mixture is first added 0.2 parts of boric acid followed by addition of 4 parts of polydiethoxysiloxane (50%). After the boric acid is dissolved, 0.6 parts tetrabutoxy titanate and then 6.5 parts water are added. By adding the water slowly, premature hydrolysis of the tetrabutoxy titanate may be prevented. After about one hour, 1.6 parts of a 0.5% solution-suspension of calcium hydroxide in isopropyl alcohol is added and the mixture is allowed to react for at least one hour and is then ready for application.

REFERENTIAL EXAMPLE 20

To a container containing 10 parts of polydiethoxysiloxane (~50%) is added 20 parts of isopropyl alcohol and 0.2 parts of aluminum isopropoxide, followed by 5 parts of phenyltrimethoxysilane. The mixture is stirred until it becomes clear. At that time, while continuing stirring, 2.3 parts of water are added, followed by 5 parts of phenyltrimethoxysilane. After stirring for about 3 hours, the mixture may be applied.

REFERENTIAL EXAMPLE 21

To a container containing 10 parts of polydiethoxysiloxane (approx. 50%) is added, while stirring, 20 parts of isopropyl alcohol and 0.1 part of boric acid. Stirring is continued until the solution becomes clear. Then, 0.2 parts of titanium tetrabutoxy oxide are added. The mixture is stirred for about 3 hours. Then, 2.3 parts of water are added, while stirring, followed by 5 parts of phenyltrimethoxysilane. After stirring for an additional about 3 hours, the solution may be applied.

REFERENTIAL EXAMPLE 22

200 parts methyltrimethoxysilane and 100 parts isopropyl alcohol are mixed in a first container (Container A). Separately, in Container B, 40 parts of a saturated solution of calcium hydroxide is diluted with 20 parts of water before the diluted solution is added to Container A.

In Container C, 6.2 parts boric acid is dissolved in 96.8 parts of isopropyl alcohol and is then combined after cooling begins, with the contents of Container A (to which the contents of Container B has been added).

After about three days, the resulting mixture forms a sprayable or wipable coating composition.

REFERENTIAL EXAMPLE 23

20 parts each of methyltrimethoxysilane and isopropyl alcohol are mixed in a first container, Container A. Then, 0.3 part of boric acid is added, followed by addition of 0.2 to 0.3 part of tetrabutyl titanate to assist in the solubilization of the boric acid catalyst. Finally, 10 to 20 parts of water are slowly added since the reaction is exothermic. After a few minutes, the mixture will warm up and is ready to be applied.

REFERENTIAL EXAMPLE 24

In a first container, isopropyl alcohol, methyltrimethoxysilane, phenyltrimethoxysilane and isobutyltrimethoxysilane are mixed in amounts of 10 parts, 15 parts by weight, 1 part by weight and 5 parts by weight, respectively. In a second container, N-(2-aminoethyl)-3-aminopropyltrimethoxysilane, water, acetic acid, ethylene glycol monoethyl ether and titanium dioxide are mixed in amounts of 0.2 part by weight, 13 parts by weight, 0.4 part by weight, 3 parts by weight and 0.2 part by weight, respectively. After combining the contents of the two containers, the resulting mixture is allowed at least four hours to homogenize. The so-formed liquid mixture is ready to be applied.

REFERENTIAL EXAMPLE 25

5 parts by weight of phenyltrimethoxysilane are added to a container containing 15 parts by weight of methyltrimethoxysilane. While mixing, 0.3 part by weight of tetrabutoxytitanate are added, along with 15 parts by weight of ethyl polysilicate, which has been hydrolyzed to 40% silica, and 15 parts by weight of isopropyl alcohol. After mixing, 13 parts by weight of an aqueous 6% boric acid solution are added and, after waiting eight hours, the resulting mixture is ready to be applied.

REFERENTIAL EXAMPLE 26

5 parts by weight of phenyltrimethoxysilane and 2 parts by weight of γ-glycidyloxypropyltrimethoxysilane are added to a vessel containing 15 parts by weight of methyltrimethoxysilane and mixed. While mixing, 0.4 part by weight of tetraisopropyoxytitanate in 20 parts isopropyl alcohol is added. The resulting non-aqueous composition is ready to be applied.

REFERENTIAL EXAMPLE 27

To a vessel containing 15 parts by weight of methyltrimethoxysilane and 15 parts isopropyl alcohol, there is added, while stirring, 5 parts by weight of phenyltrimethoxysilane. To the resulting mixture, while continuing stirring, 0.2 part by weight of tetrabutoxytitanate is added, followed by 4 parts by weight of ethyl polysilicate (hydrolyzed to 40% silica), and 0.2 part by weight of vinyltriacetoxysilane. The resulting composition is ready to be applied.

REFERENTIAL EXAMPLE 28

This formulation illustrates a coating composition which is shown formulated as a three container system (i.e., water; silane/alcohol; catalyst).

In one container a mixture of 20 parts of methyltrimethoxysilane and 20 parts isopropyl alcohol is provided. While the silane-alcohol mixture is being stirred, 20 parts water is added. After thoroughly mixing, 1 part of an amine stabilized titanium catalyst (e.g., Tyzor™ 131, from E. I. duPont de Nemours), is further added. The composition is allowed to react for about 4 hours and is ready for application. In this system, the alcohol prevents formation of a two-phase mixture.

In any of the above formulations, the amount of alcohol or other diluent can be increased at will, e.g., to reduce the solids loading level, improve sprayability or flowability, or otherwise, if necessary, further increase phase stability.

EXAMPLE 1

Both new and existing (corroded) air-conditioning units (The Trane Company, Jacksonville, Fla.), located in a Jacksonville Electric Authority sewage treatment plant were treated with a coating composition according to the above Referential Example 1, or were left untreated. The coating compositions were applied, after the units were thoroughly washed, one to three times, with soapy water, rinsed and dried, using hand held pump sprayers. The applied coatings, before beginning to gel, may be wiped with a cloth or sponge to remove excess or pooled coating composition.

In this location, all metal surfaces and parts of the units are normally reduced to inoperable condition by gases (e.g., flue gases) and corrosive chemicals after as little as two months operation, and, in general, after only 4 to 6 months, on average. Power usage was monitored by either Florida Power and Light or by Jacksonville Electric Authority. Thermal cooling changes were monitored by The Trane Company. Improvements for highly corroded units were as high as 84%. Improvements for new units ranged from 1 to 10%. Moreover, the units treated according to this invention were examined by an independent laboratory and found to have only superficial corrosion after more than 22 months. It is also observed that the coated units stay cleaner longer than the uncoated units and are more easily cleaned.

Similar results will be obtained using the coating compositions of other Referential Examples given above.

EXAMPLE 2

Air conditioning units in the U.S. Naval Facility at NS Mayport, Jacksonville, Fla., were tested with the coating composition as prepared in the above Referential Example 8. In this case, the entire unit, including the external electrical boxes, cabinets, screws, valves, cooling fins, wires, etc., was coated with the invention coating composition. The units are first thoroughly washed with soapy water, rinsed and dried, before the coating is applied. The application can be achieved using any type of manual sprayer, or with a mechanical sprayer. For comparison, units were either coated with conventional organic coatings, were overcoated on the organically coated units with a coating composition according to this invention, were coated directly on the untreated unit or were not coated. The units coated with the silane coating compositions of the present invention were substantially corrosion free after more than one years service. In contrast, the organically treated unit and the untreated unit underwent substantial corrosion in as little as two months.

Similar results may be obtained using coating compositions of other representative compositions of the above Representative Examples.

EXAMPLE 3

By applying the coating composition of Referential Example 1B to the evaporator of an HVAC unit located on the outside of an apartment building or office building, the coated evaporator is able to prevent growth or collection of fungal spores and bacteria, thereby preventing future transport of the undesirable microorganisms into the building through the HVAC system. Similar results can be achieved with other representative coating compositions described in the above Referential Examples or elsewhere within the above disclosure.

What is claimed is:

1. A method for improving efficiency of heat transfer from a heat transfer medium flowing in heat transfer contact with a heat transfer surface of a thermally conductive component of a heat transfer system across said heat transfer surface, said method comprising coating at least a portion of said heat transfer with a curable, reactive, film-forming, coating composition having a low viscosity capable of penetrating into micron and submicron size voids in said heat transfer surface, and curing the composition to thereby form an at least substantially continuous glassy coating on said heat transfer surface, said coating extending into voids and defects which may be present in said heat transfer surface, whereby a fungi-proof, hydrophobic and thermally conductive corrosion protective layer is provided on said heat transfer surface wherein said coating composition comprises an aqueous or non-aqueous oligomeric low molecular weight silane coating composition formed by admixing (a) at least one silane of the formula (1)

$$R^1{}_n Si(OR^2)_{4-n} \quad (1)$$

where $R^1$ represents a $C_1$–$C_6$ alkyl group, a $C_6$–$C_8$ aryl group or a functional group including at least one of vinyl, acrylic, amino, mercapto, or vinyl chloride functional groups, $R^2$ represents a $C_1$–$C_6$ alkyl or acetyl group and n is a number of 1 or 2;

(b) silane condensation catalyst, and
(c) $C_2$–$C_4$ alkanol solvent, and;
(d) (ii) colloidal aluminum hydroxide, (iii) metal alcoholate of formula (2):

$$M(OR^3)_m \quad (2)$$

where M is a metal valence 2, 3 or 4, or mixture of two or more such metals;
  $R^3$ represents a $C_1$–$C_6$ alkyl group,
  m represents a number or 2, 3 or 4, or mixture of (ii) and (iii); and
(e) water;
and curing the applied coating composition.

2. The method according to claim 1, for increasing the contact area between first and second heat transfer surfaces in thermal contact with each other, thereby improving the heat transfer efficiency across the thermally contacting heat transfer surfaces, said method comprising, applying said low viscosity, penetrating coating composition to the thermally contacting heat transfer of at least one of said first and second heat transfer surfaces.

3. The method according to claim 2, wherein the coating composition comprises an aqueous or non-aqueous oligomeric silane coating composition formed by admixing
  (a) at least one silane of the formula (1)

$$R^1{}_n Si(OR^2)_{4-n} \quad (1)$$

where $R^1$ represents a lower alkyl group, a $C_6$–$C_8$ aryl group or a functional group including at least one of vinyl, acrylic, amino, mercapto, or vinyl chloride functional groups;
  (b) silane condensation catalyst, and
  (c) lower alkanol solvent, and optionally, one or more of
  (d) colloidal aluminum hydroxide;
  (e) metal alcoholate of formula (2):

$$M(OR^3)_m \quad (2)$$

where M is a metal valence 2, 3 or 4, or mixture of two or more such metals;
  R represents a lower alkyl group; and,
  m represents a number or 2, 3 or 4;
  (f) silica component selected from the group consisting of alkali metal silicate, ethyl orthosilicate, ethyl polysilicate, and colloidal silica dispersed in lower alkanol;

(g) color forming silanol condensation catalyst;
(h) epoxysilane;
(i) ultrafine titanium dioxide ultraviolet light absorber;
(j) water;
(k) co-solvent;

and wherein the oligomeric coating composition is allowed to cure to a film thickness of from about 5 to about 150 millions of an inch, thereby filling any microvacancies in said heat transfer surfaces.

4. The method according to claim 1, for improving the efficiency of heat exchange apparatus of the type wherein a metal heat transfer surface is swaged or force fit to a metal heat transfer fluid conveyance, said method comprising, applying to the interface between the heat transfer surface and the conveyance said low viscosity, penetrating coacting composition whereby the coating composition will displace gasses and liquids in said interface; and allowing the coating composition to cure to a film thickness of from about 5 to about 150 millions of an inch, and fill any microvacancies in said metal surfaces at said interface.

5. The method according to claim 4, wherein the coating composition comprises an aqueous or non-aqueous oligomeric silane coating composition formed by admixing (a) at least one silane of the formula (1)

$$R^1{}_nSi(OR^2)_{4-n} \qquad (1)$$

where $R^1$ represents a $C_1$–$C_6$ alkyl group, a phenyl group or a functional group including at least one of vinyl, acrylic, amino, mercapto, or vinyl chloride functional groups, $R^2$ represents a lower alkyl or acetyl group and n is a number of 1 or 2;

(b) silane condensation catalyst, and
(c) $C_2$–$C_4$ alkanol solvent, and optionally, one or more of
(d) colloidal aluminum hydroxide;
(e) metal alcoholate of formula (2):

$$M(OR^3)_m \qquad (2)$$

where M is a metal valence 2, 3 or 4, or mixture of two or more such metals;
  $R^3$ represents a $C_1$–$C_6$ lower alkyl group; and,
  m represents a number or 2, 3 or 4;

(f) a silica component selected from the group consisting of alkali metal silicate, ethyl orthosilicate, ethyl polysilicate, and colloidal silica dispersed in lower alkanol;
(g) color forming silanol condensation catalyst;
(h) epoxysilane;
(i) titanium dioxide ultraviolet light absorber;
(j) water;
(k) co-solvent.

6. The method according to claim 1, wherein said heat transfer surface comprises a fin and tube heat transfer device.

7. The method of claim 1, wherein the coating composition has a viscosity, measured using a No. 2 (#2) Zahn cup, of from about 4 to about 10 seconds, measured at room temperature (approximately 18°).

8. The method of claim 1, wherein the coating composition inhibits growth of bacteria.

* * * * *